March 11, 1958     C. R. FAST ET AL     2,826,547
DRILLING FLUID FOR FORMING SETTABLE FILTER CAKE
Filed May 17, 1956
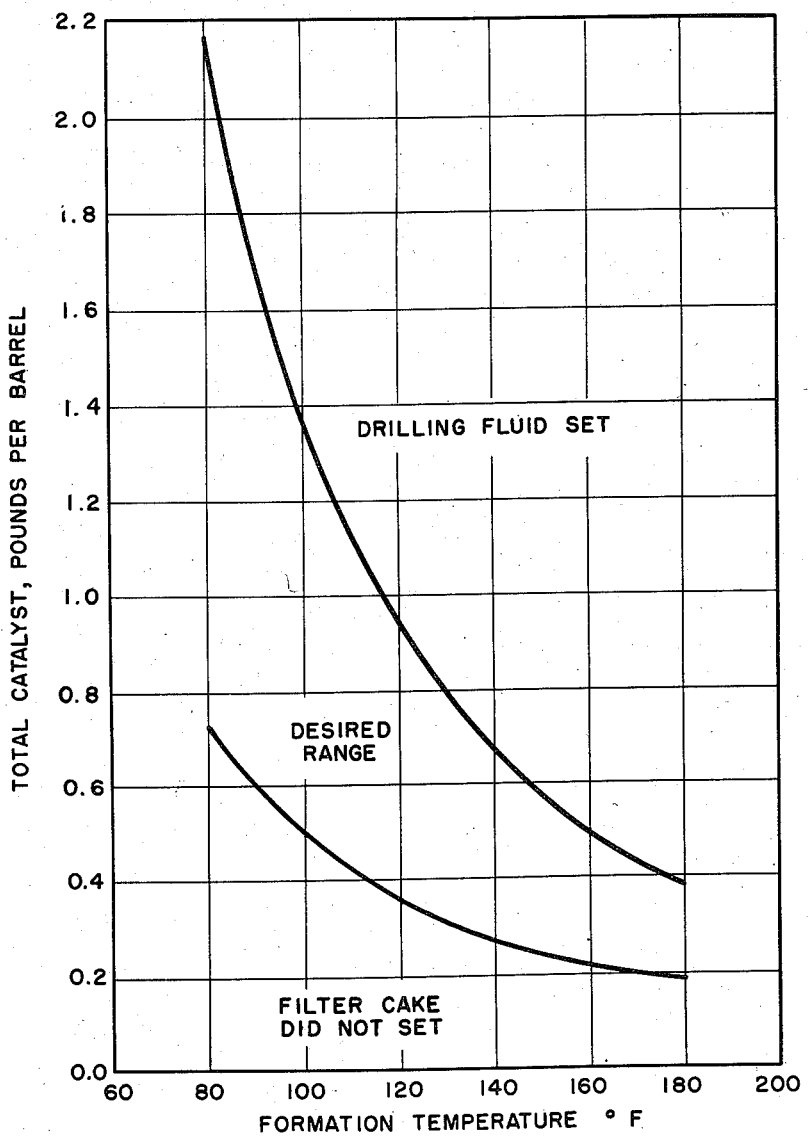
INVENTORS
CLARENCE R. FAST
ALFRED O. FISCHER
BY    BILLY V. RANDALL
ATTORNEY

2,826,547
DRILLING FLUID FOR FORMING SETTABLE FILTER CAKE

Clarence R. Fast, Tulsa, Okla., Alfred O. Fischer, Alice, Tex., and Billy V. Randall, Tulsa, Okla., assignors to Pan American Petroleum Corporation, a corporation of Delaware Application May 17, 1956, Serial No. 585,572

6 Claims. (Cl. 252—8.5)

This invention relates to drilling fluids. More particularly, it relates to a drilling fluid which will lay down a filter cake during drilling operations, said filter cake being of such a nature that it will set to form a strong impermeable casing for the well.

Many means have been proposed in the past for forming an impermeable sheath of material over the surface of a well. For example, molten materials have been applied to the well walls. Such means require special techniques of application and special equipment for applying the material. Obviously it would be highly desirable to employ a drilling fluid which would automatically form such a sheath during drilling operations.

An object of this invention is to provide a drilling fluid and a method for drilling which will result in the formation on the walls of the well of a filter cake which will set to form a strong impermeable casing for the well. We have found that the above and other objects of our invention may be accomplished by use of calcium acrylate in calcium base mud, together with a certain catalyst, all within definite limits. A drilling fluid can be prepared in this way which will not set permanently, but which will lay down a filter cake which will set on the walls of the well.

The basic composition used in preparing our drilling fluid is a calcium base mud as normally used in drilling operations. This mud contains water as the base liquid. Sometimes a little petroleum oil or one of its fractions may be added. The other principal ingredients are clay solids, caustic, a breakover chemical, and a source of calcium ions. A weighting agent may also be present. These constituents should be present within the following limits for our purposes.

| Material: | Concentration, lb./bbl. |
| --- | --- |
| Clay solids | 5 to 100 |
| Caustic | ½ to 5 |
| Breakover chemical | 1 to 10 |
| Calcium ion source | 1 to 25 |
| Weighting agent | 0 to 500 |

The clay solids may be of any type such as montmorillonite, illite, kaolin, attapulgite, or the like. The minimum concentration limit is imposed to insure the formation of a good filter cake which can set. The upper limit should be observed to avoid any possible tendency of the mud itself to set.

The caustic may be NaOH, KOH, or the equivalent, although the former is preferred. The lower concentration limit is set by the requirements of solubilizing most breakover materials. The maximum limit is set to avoid calcium precipitation and adverse effects of the alkali metal ion on the calcium acrylate polymerization.

The breakover chemical may be quebracho, a lignosulfonate, a lignite, a condensed naphthalene sulfonate, or the like. The nature of the breakover chemical normally is not important. If salts are used, preferably they should not be alkali metal salts to avoid high concentrations of alkali metal ions in the drilling fluid. An exception is the class of condensed naphthalene sulfonates. These have the general formula $$C_{10}H_6SO_3A(CH_2C_{10}H_5SO_3A)_nC_{10}H_6SO_3A$$

For our purposes, $n$ should be between 1 and about 5. The letter A represents an alkali metal, preferably sodium. When the term "condensed naphthalene sulfonate" is used herein, a material falling within these limits is intended.

The calcium ion source may be lime, cement, gypsum or the like. If such materials are used, at least about 1 pound per barrel should be employed to provide the desired amount of calcium ion in the lime base mud. Usually not more than about 10 pounds per barrel are used but much larger amounts can be employed if desired. If a calcium base mud is not already available in the field, it is possible, and may be desirable, to use the calcium acrylate itself as a source of calcium ion. In this case no other source of calcium need be present.

The weighting agent, if any, should preferably be barite. Other materials having high densities normally used for weighting drilling fluids may be used, however. None of such materials need be present for our purposes. As much as 500 pounds per barrel may be present without seriously affecting the setting tendency of the drilling fluid, so long as the concentrations of calcium acrylate and catalysts are adjusted, as described below, in accordance with the water content of the drilling fluid.

It will be noted that the limits stated above include most calcium base muds now in commercial use. With few exceptions, any available calcium base mud can be used as the base composition for preparing our drilling fluid. If there is any doubt of the suitability of a calcium base mud, calcium acrylate, catalyst and iron or copper salt should be added to a pilot batch and a high temperature filter press test should be run, as described below, to be sure the calcium base mud is suitable for use.

In addition to the normal calcium base mud ingredients, our drilling fluid should contain the following materials if the mud weighs about 10 pounds per gallon.

| Material: | Concentration, lb./bbl. |
| --- | --- |
| Calcium acrylate | 15 to 25. |
| Soluble iron salt | At least 0.1 |
| Ammonium persulfate | As defined by curves. |
| Sodium thiosulfate | As defined by curves. |
| Alkali metal salts | Not more than 10 lb./bbl. |

At least about 15 pounds of calcium acrylate should be used per barrel of drilling fluid in order to insure a reasonable strength in the filter cake. Normally not more than about 25 pounds per barrel should be employed in order to avoid a possible tendency for the drilling fluid to set permanently. In addition, higher concentrations should be avoided in order not to increase the cost of the drilling fluid. Preferably about 20 pounds of calcium acrylate should be added per barrel of drilling fluid.

It has been found that soluble iron salts such as ferric sulfate, ferrous chloride or even the iron hydroxides have a tendency to initiate and promote polymerization of calcium acrylate. This is also true of copper salts. Since considerable steel and some brass equipment is used in connection with drilling a well it is impossible to predict how much iron and copper may be present in a drilling fluid. Thus, if the concentrations of calcium acrylate and catalyst are adjusted for an iron-free system and iron contamination occurs, the drilling fluid as well as the filter cake may set permanently. On the other hand, if the mud is designed for a slight iron content and no contamination occurs, the filter cake may not set. Fortunately, it has been found that if at least about 0.1 pound of soluble iron or copper salt is present per barrel of drilling fluid, further addition of iron or copper does not greatly affect the setting tendencies of the mud and filter cake. Therefore, about 0.25 pound of soluble iron or copper salt is normally added to our drilling fluid to overcome the difficulty of varying setting tendencies with varying iron and copper contents. For our purposes a water-soluble iron or copper salt is one having a solubility of at least about 0.1 pound per 42-gallon barrel of water. When reference is made hereinafter to a salt of iron or copper, a single salt or combination of suitable salts may be used.

The total concentration of catalyst depends upon the temperature of the formation to be drilled. A composition prepared for a cool shallow formation might contain more catalyst than desired for warmer formations drilled later using the same mud as the well becomes deeper. As a practical matter, this never happens. Due to the introduction of water and additives into the drilling fluid during drilling operations, the mud is diluted much more rapidly than required to keep the catalyst concentration below the maximum limit as the well is deepened into the warmer zones. The principal problem is keeping the concentration of calcium acrylate and catalyst up to the desired levels. The best method of control is probably to make periodic measurements in a high temperature filter press as described below in connection with the experimental derivation of the curves shown in the drawing. If the filter cake shows a tendency not to set as hard as desired at the temperature of the formation being drilled, more catalyst and calcium acrylate should be added to a pilot batch or two. These batches should then be tested in the high temperature filter press. The tests will show how much calcium acrylate and catalyst should be added to the mud system to cause the filter cake to set without setting the mud. The amount of calcium acrylate added should normally be from about 20 to 50 times the sum of the amounts of both catalyst components. The lower ratio should normally be used for lower temperatures while the higher ratio should usually be employed for higher temperatures.

Normally, the total catalyst should consist of about 50 percent ammonium persulfate and 50 percent sodium thiosulfate by weight. This ratio can be varied somewhat but the concentration of neither one should be less than about 33 percent or more than about 67 percent. Under some conditions oxidizing agents other than ammonium persulfate and reducing agents other than sodium thiosulfate may be employed. Preferably, however, the two catalysts named should be used in view of the much greater experience with these materials. Both materials are necessary for the catalytic action. Therefore, the combination is generally referred to as a catalyst rather than two catalysts. Nevertheless, the two materials should be stored and used separately since they react readily in high concentrations to destroy their catalytic effects.

An upper limit of about 10 pounds per barrel of water-soluble alkali metal salts should be observed. The reason is that the alkali metal ions adversely affect polymerization of the calcium acrylate. A weak set is normally obtained in the presence of high concentrations of alkali metal ions. It is believed this is due to the formation, by double decomposition and recombination, of alkali metal acrylates. Since the alkali metal groups cannot cross-link acrylic acid polymers, the presence of the alkali metal ions greatly weaken the ultimate polymer. If sufficient alkali metal ions are present, the polymer may even become water-soluble. The upper limit of 10 pounds per barrel includes the concentration of caustic used for breaking over the mud to lime base. This precaution regarding alkali metal salts is applicable only to the unset calcium acrylate. After polymerization, calcium acrylate can withstand brines containing high alkali metal ion concentration.

Our invention may be further explained by reference to the accompanying drawing. In this drawing, the upper curve defines the maximum catalyst concentration which a drilling fluid weighing about 10 pounds per gallon can tolerate if setting of the drilling fluid itself is to be avoided at any given formation temperature. The lower curve defines the minimum catalyst concentration if the filter cake laid down by the drilling fluid is to set and form a strong impermeable sheath for the well wall. The lower curve can be defined by the equation $$C = \left(\frac{3500}{t^2} + \frac{4}{t}\right)\frac{w}{300}$$

The upper curve can be represented by the equation $$C = \left(\frac{15000}{t_2} - \frac{14}{t}\right)\frac{w}{300}$$

In these equations, $C$ is the concentration of catalyst in pounds per barrel of drilling fluid; $t$ is the temperature in degrees F, of the formation to be drilled with the drilling fluid; and, $w$ is the weight of water per barrel of drilling fluid.

The data on which the curves and equations are based were obtained in the following manner. A 9.5 pound per gallon natural mud from Velma Field, Oklahoma, was converted to a calcium base by adding 2 pounds of quebracho, ½ pound of caustic and 20 pounds of calcium acrylate per barrel of drilling fluid. The drilling fluid with these additives was mixed thoroughly. To the resulting calcium base mud, 1 pound of ammonium persulfate and 1 pound of sodium thiosulfate per barrel of drilling fluid were added consecutively, with constant stirring. One-fourth pound of ferric sulfate was then added per barrel of drilling fluid. Finally 5 pounds of condensed sodium naphthalene sulfonate per barrel of drilling fluid were added to bring the drilling fluid properties into the desired range. This drilling fluid was placed in a high-temperature, high-pressure filter press. This equipment is shown on page 113 and described in detail on pages 115 and 116 of "Composition and Properties of Oil Well Drilling Fluids" (1953 edition), by Walter F. Rogers, Gulf Publishing Company. The equipment is essentially a small filter press immersed in a hot water bath. The test had been modified slightly by substituting for the filter paper, 25 ml. of river sand which had been screened to pass a 40 mesh screen. After the filtrate rate determination had been made, the sand and resulting filter cake from the operation were allowed to stand for 16 hours. The sand layer and filter cake were then removed from the test equipment and the shear strengths were measured. The condition of the drilling fluid remaining in the filter press equipment was also noted to determine if it had developed a permanent set. This test was repeated at various temperatures and with drilling fluids containing various concentrations of the ammonium persulfate and sodium thiosulfate until the curves shown in the drawing were established.

In the tests, it was found that even though insufficient catalyst was present to cause setting of the drilling fluid, the filtrate from the filter press frequently set. In addition, the sand layer under the filter cake usually developed a definite set if sufficient catalyst was persent to cause setting of the filter cake itself. It is not altogether clear why the filtrate from the equipment or that in the sand set while the liquid in the drilling fluid did not. A possible explanation is as follows:

It is known that calcium acrylate tends to ionize to form a calcium ion carrying a single acrylate group. This modified calcium ion is capable of base exchange on a clay surface to displace sodium ions and become attached to the clay surface. The tendency of calcium ions to replace sodium ions is believed to be enhanced by the conditions present in calcium base muds. Therefore, in our calcium base muds the calcium ions with acrylate groups attached, should be strongly attracted to the surfaces of clay particles. The semi-salts of calcium acrylate attached to clay particles, will, of course, be in equilibrium with calcium acrylate in the solution. In the filter cake, the clay solids are highly concentrated and the individual particles are pressed closely together. The calcium acrylate films on the surfaces of the particles are brought together to establish high local concentrations of calcium acrylate in the liquid between the particles. The concentration of calcium acrylate in the liquid exposed to the filter cake should, therefore, be much higher than that in the drilling fluid. This would explain the setting of the filter cake. As the filtrate passes through the filter cake into the sand layer and on out of the filter press, it carries a high concentration of calcium acrylate, approaching the concentration of calcium acrylate in the filter cake. Therefore, the filtrate sets in the sand layer and in the container receiving filtrate from the equipment.

Another possible explanation of the observed behavior is that polymerization is initiated in the filter cake when acrylate-containing clay particles are pressed closely together. Once initiated, the polymerization may continue in the filtrate passing into the sand layer and on out of the filter press.

Although either or both the above theories may explain the observed behavior, we do not, of course, wish to be limited to these theories.

In determining whether the filter cake and sand layer were set in the described work, the most convenient test was whether the sand layer and filter cake could be removed easily from the filter press without breaking apart and could withstand reasonable handling without crumbling. In addition, equipment was set up to measure the shear strength of the filter cake and sand layer. For this test, a specimen was sliced from the filter cake or sand layer. Preferably the specimen was about 1/8 inch thick. It was placed over a 3/8 inch hole in a horizontal steel plate. A rod 1/4 inch in diameter was then placed on end on the specimen over the center of the hole. The weight which had to be applied to the top of the rod to cause it to penetrate the specimen was then determined as a measure of the shear strength of the filter cake or sand layer. A numerical value for shear strength was obtained by the following formula:

$$S = \frac{p}{\pi d h}$$

In this formula S is the shear strength in pounds per square inch, $d$ is the rod diameter in inches, $h$ is the specimen thickness in inches, and $p$ is the weight on the rod in pounds. In order to insure a strong filter cake sheath on the well wall, the filter cake, after 16 hours in the high temperature filter press should have a shear strength of at least about 10 pounds per square inch in the descirbed test.

The drilling fluid was considered unsatisfactory if it would not pour readily from the filter press after 16 hours. It was also considered unsatisfactory if strings or fibers of polymer were apparent, even though the main body of the mud was fluid.

The values given above for concentrations of both calcium acrylate and catalyst are for unweighted natural muds weighing up to about 10 pounds per gallon. For weighted muds, where the water content may be considerably lower than in unweighted muds, less calcium acrylate and catalyst should be added. This avoids developing high concentrations of these materials in the smaller amount of water and thus possibly increasing the tendency of the drilling fluid to set. For example, a natural unweighted mud weighing about 10 pounds per barrel will contain about 300 pounds of water per barrel of drilling fluid. If this mud is weighted to about 16 or 17 pounds per gallon, it may contain as little as 200 pounds of water per barrel of drilling fluid. The amount of calcium acrylate and catalyst in the weighted drilling fluid should be only about 2/3 that in the unweighted mud if the concentration of these materials in the water is to be the same in both cases. This explains the factor $w/300$ used in the equations for determining maximum and minimum limits on the concentration of catalyst. The same factor should be applied to the 15 to 25 pounds of calcium acrylate suggested for unweighted muds. In this factor $w$ is the water content of the mud in pounds per barrel of drilling fluid. Applying the factor $w/300$ to the 15 to 25 pound per barrel range of calcium acrylate concentration, the range for general purposes becomes $$15 \frac{w}{300} \text{ to } 25 \frac{w}{300}$$

This can be simplified to $w/20$ to $w/12$ pounds of calcium acrylate per barrel of drilling fluid. Similarly, the total catalyst content of the drilling fluid should be between $2.1 \, w/300$ and $0.18 \, w/300$ pounds per barrel of drilling fluid.

In preparing the drilling fluid, the calcium base mud should first be mixed if it is not already available in the field. Then the calcium acrylate should be added with continuous agitation. Next, the catalyst components should be added slowly, one at a time, again with continuous agitation to prevent local high concentrations. Then the iron or copper salt should be added. Finally, the properties of the drilling fluid should be adjusted to the desired values by standard means for control of calcium base drilling fluids.

The drilling fluid is used in the same manner as any calcium base mud. That is, it is circulated in the well where it contacts the permeable formations to lay down a filter cake. The filter cake from our drilling fluid, unlike that from other drilling fluids, however, automatically sets to form a hard impermeable sheath on the wall of the well. The filtrate passing through the filter cake also tends to set up in the capillaries of the formation. In this way the filter cake is firmly bonded to the formation. In addition, the formation itself is strenghened and made more impermeable.

We claim:

1. A drilling fluid for drilling a well and simultaneously depositing on the wall thereof a strong impermeable sheath, comprising a calcium base mud, and in each barrel of said mud, at least about 0.1 pound of a water-soluble salt of a metal selected from the group consisting of iron and copper, not more than about 10 pounds of alkali metal salts including any caustic, from about $w/20$ to about $w/12$ pounds of calcium acrylate, and from about $0.18 \, w/300$ to about $2.1 \, w/300$ pounds of catalyst consisting of from about 33 to about 67 percent ammonium persulfate and about 67 to about 33 percent sodium thiosulfate, where $w$ is the water content of said drilling fluid in pounds per barrel.

2. A drilling fluid for drilling a well and simultaneously depositing on the wall thereof a strong impermeable sheath, comprising a water base, and in each barrel of said drilling fluid from about 5 to about 100 pounds of clay, from about 1/2 to about 5 pounds of caustic, from about $w/20$ to about 50 pounds of a calcium ion source of which between about $w/20$ and about $w/12$ pounds is calcium acrylate, from about 1 to about 10 pounds of a breakover chemical, from 0 to about 500 pounds of a weighting agent, at least about 0.1 pound of a water-soluble salt of a metal selected from the group consisting of iron and copper, not more than about 10 pounds of alkali metal salts including caustic, and from about $0.18 \, w/300$ to about $2.1 \, w/300$ pounds of catalyst consisting of from about 33 to about 67 percent ammonium persulfate and from about 67 to about 33 percent sodium thiosulfate, where $w$ is the water content of said drilling fluid in pounds per barrel.

3. The drilling fluid of claim 2 in which said breakover chemical is selected from the group consisting of quebracho, calcium lignosulfonate, and condensed naphthalene sulfonates, said caustic is caustic soda, and said water-soluble salt is ferric sulfate.

4. The method of simultaneously drilling a well and depositing on the walls thereof a strong impermeable sheath, comprising circulating in said well a drilling fluid comprising a lime base mud, and in each barrel of said mud, at least about 0.1 pound of a water-soluble salt of a metal selected from the group consisting of iron and copper, not more than about 10 pounds of alkali metal salts including any caustic, from about $w/20$ to about $w/12$ pounds of calcium acrylate, and from about $$\left(\frac{3500}{t^2}+\frac{14}{t}\right)\frac{w}{300}$$

to about $$\left(\frac{15000}{t^2}-\frac{14}{t}\right)\frac{w}{300}$$

pounds of catalyst consisting of from about 33 to about 67 percent ammonium persulfate and about 67 to about 33 percent sodium thiosulfate, where $t$ is the temperature, in degrees F., of the formation being drilled, and $w$ is the water content of the drilling fluid in pounds per barrel; and contacting the formations penetrated by the well with said drilling fluid during drilling operations to deposit a filter cake which will set automatically on the wall of said well to form a strong impermeable sheath bonded to said formation by setting of filtrate penetrating said filter cake from said drilling fluid.

5. The method of claim 4 in which said drilling fluid comprises a water base, and in each barrel of said drilling fluid from about 5 to about 100 pounds of clay, from about ½ to about 5 pounds of caustic, from about $w/20$ to about 50 pounds of a calcium ion source of which between about $w/20$ and about $w/12$ pounds is calcium acrylate, from about 1 to about 10 pounds of a breakover chemical, from 0 to about 500 pounds of a weighting agent, at least about 0.1 pound of a water-soluble salt of a metal selected from the group consisting of iron and copper, not more than about 10 pounds of alkali metal salts including said caustic, and from about $$\left(\frac{35000}{t^2}+\frac{14}{t}\right)\frac{300}{w}$$

to about $$\left(\frac{15000}{t^2}+\frac{14}{t}\right)\frac{300}{w}$$

pounds of total catalysts, consisting of from about 33 to about 67 percent ammonium persulfate and from about 67 to about 33 percent sodium thiosulfate, where $t$ is the temperature, in degrees F., of the formation being drilled, and $w$ is the water content of the drilling fluid in pounds per barrel.

6. The method of claim 5 in which said breakover chemical is selected from the group consisting of quebracho, calcium lignosulfonate, and condensed naphthalene sulfonates, said caustic is caustic soda, and said water-soluble salt is ferric sulfate.

References Cited in the file of this patent

UNITED STATES PATENTS

| | | |
|---|---|---|
| 2,274,297 | Irons et al. | Feb. 24, 1942 |
| 2,552,775 | Fischer et al. | May 15, 1951 |
| 2,556,169 | Crouch et al. | June 12, 1951 |
| 2,651,619 | De Mello et al. | Sept. 8, 1953 |
| 2,651,885 | Hedrick et al. | Sept. 15, 1953 |
| 2,651,886 | Mowry et al. | Sept. 15, 1953 |
| 2,718,497 | Oldham et al. | Sept. 20, 1955 |
| 2,801,984 | Morgan et al. | Aug. 6, 1957 |